United States Patent [19]

Yamamori et al.

[11] Patent Number: 4,764,780

[45] Date of Patent: Aug. 16, 1988

[54] INK EJECTION RECORDING APPARATUS HAVING MEANS FOR EQUALIZING THE STATIC INK PRESSURES OF A PLURALITY OF INK NOZZLES ARRANGED AT DIFFERENT HEIGHTS

[75] Inventors: Kiyoshi Yamamori, Yokohama; Shigeyoshi Hasegawa; Yuuji Mogi, both of Tsukui; Tamotsu Kojima, Sashima; Sadashi Higuchi, Kawasaki, all of Japan

[73] Assignee: Matsushita Electric Industrial Co., Ltd., Osaka, Japan

[21] Appl. No.: 944,005

[22] Filed: Dec. 22, 1986

[30] Foreign Application Priority Data

Dec. 25, 1985 [JP] Japan ............ 60-295210
Dec. 25, 1985 [JP] Japan ............ 60-200160

[51] Int. Cl.[4] ............ G01D 15/16
[52] U.S. Cl. ............ 346/140 R; 137/625.12
[58] Field of Search ............ 346/140, 75; 358/75, 358/77, 78; 137/625.12

[56] References Cited

U.S. PATENT DOCUMENTS 3,553,371 1/1971 Suenaga ............ 358/77
4,106,032 8/1978 Miura ............ 346/140
4,223,324 9/1980 Yamamori ............ 346/140
4,301,460 11/1981 Miura ............ 346/140
4,340,896 7/1982 Cruz-Uribe ............ 346/140

*Primary Examiner*—Joseph W. Hartary
*Attorney, Agent, or Firm*—Stevens, Davis, Miller & Mosher

[57] ABSTRACT

An ink ejection recording apparatus is disclosed which comprises a plurality of ink ejection heads commonly connected to an ink tank, each of the ink ejection heads having an ink nozzle through which minute ink droplets are discharged in accordance with an electric signal and an air nozzle opposing to the ink nozzle and adapted for forming an air stream which accelerates the ink droplets towards a recording medium so as to record an image on the recording medium by means of the droplets. The ink ejection heads are arranged at different heights and the ink ejection heads have different levels of balance pressure so that the levels of the ink pressure acting on the ink nozzles of the ink ejection head are equalized in the operating state of the apparatus. Pressure relieving means are provided for relieving pneumatic pressure applied to the ink ejection heads and to the ink tank and being arranged such that relief of pressure from said ink tank is conducted after relief of pressure from said ink ejection heads.

11 Claims, 4 Drawing Sheets

INK EJECTION RECORDING APPARATUS HAVING MEANS FOR EQUALIZING THE STATIC INK PRESSURES OF A PLURALITY OF INK NOZZLES ARRANGED AT DIFFERENT HEIGHTS

BACKGROUND OF THE INVENTION

The present invention relates to an ink ejection recording apparatus and, more particularly, to such an apparatus in which discharged ink droplets are accelerated by a stream of air supplied from a pressurized air source which is energized during operation of the apparatus.

The air-accelerated ink ejection apparatus disclosed in U.S. Pat. Nos. 4,106,032 and 4,301,460 includes an ink ejecting unit having a liquid chamber to which ink is supplied from a liquid container and an air chamber provided forwardly of the liquid chamber and axially aligned discharge channels for discharging ink therethrough into the atmosphere when the pressure inside the liquid chamber is increased rapidly by means of a piezoelectric transducer mounted adjacent to the liquid chamber in response to electrical drive signals applied thereto. The air chamber is constantly supplied with pressurized air from a pressure source when the apparatus is in operation to provide a stream of air that accelerates the discharged ink droplets onto a writing surface. The pressurized air is also supplied to the liquid container so that there is established a static balance between the pressure in the air and liquid chambers. This results in lowering of the minimum operating voltage of the apparatus and ensures that the reproduced image has a minutely changing gradation.

An ink ejection apparatus has been proposed and used which employs a plurality of ink ejection apparatus described above. The ink ejection apparatus has a plurality of ink tanks and ink ejection heads corresponding to the respective ink tanks. In this ink ejection apparatus, it is necessary to equalize the static pressures applied to the ink nozzles of all ink ejection heads. To this end, hitherto, the ink ejection heads and the ink tanks are arranged such that the differences in height between the ink ejection heads and the levels of ink in the associated ink tanks are equalized. With this arrangement, the static ink pressures applied to the ink nozzles of all the ink ejection heads, thus providing an equal condition for jetting of the ink.

This solution, however, cannot be applied to the case where a plurality of ink ejection heads which are arranged at different heights are connected to a common ink tank. For the purpose of attaining a high printing speed, it has been proposed to install a multiplicity of ink ejection heads, e.g., three ink ejection heads for each of yellow, magenta, cyan and black colors which amounts to 12 heads in total. In order to equalize the static ink pressures acting in all the ink ejection heads, it is necessary to install ink tanks of the same number as the ink ejection heads. Since the space available for the installation of these ink tanks is limited, the volume of each tank has to be reduced, with the result that the frequency of supply of the ink to each tank is increased undesirably. In addition, the system as a whole is so complicated that the reliability of operation of the system is impaired undesirably. It is to be pointed out also that the cost of the system as a whole is raised due to the necessity for installation of sensors on all the ink tanks for the purpose of sensing the amounts of ink remaining in these ink tanks.

SUMMARY OF THE INVENTION

Accordingly, an object of the present invention is to provide an ink ejection recording apparatus in which a plurality of ink ejection heads which are arranged at different heights are connected to a common ink tank but the static ink pressures applied to the ink nozzles of all the ink ejection heads are equalized.

To this end, according to the present invention, there is provided an ink ejection recording apparatus comprising a plurality of ink ejection heads, each of the ink ejection heads having an ink nozzle through which minute ink droplets are discharged in accordance with an electric signal and an air nozzle opposing to the ink nozzle and adapted for forming an air stream which accelerates the ink droplets towards a recording medium so as to record an image on the recording medium by means of the droplets, wherein the ink ejection heads are arranged at different heights and the ink ejection heads have different levels of balance pressure so that the levels of the ink pressure acting on the ink nozzles of the ink ejection head are equalized in the operating state of the apparatus.

The above and other objects, features and advantages of the present invention will become clear from the following description of the preferred embodiment when the same is read in conjunction with the accompanying drawings.

DESCRIPTION OF THE PREFERRED EMBODIMENT

Figure 1:
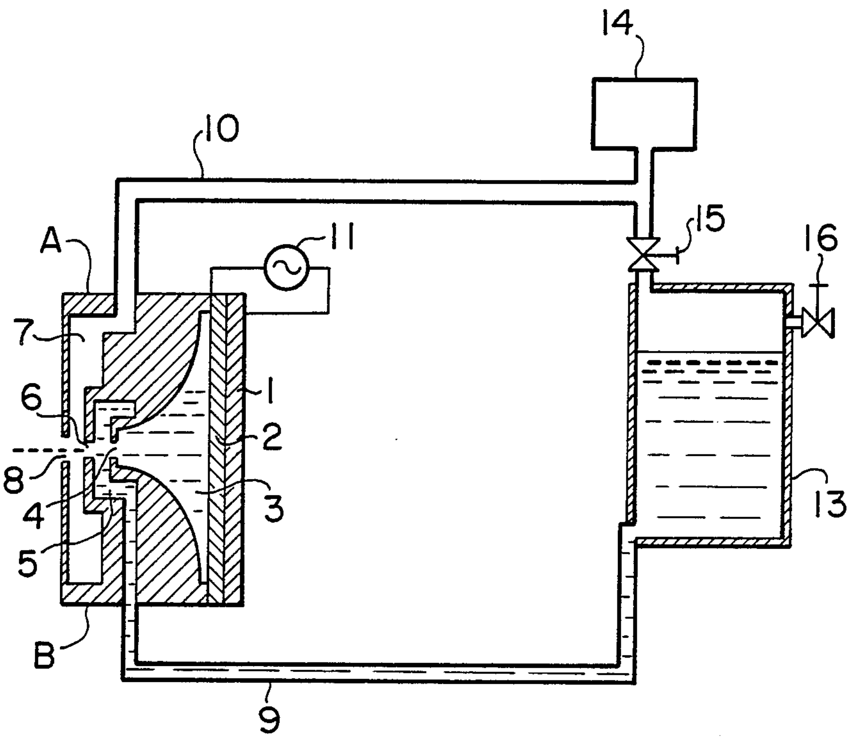
FIG. 1 PRIOR ART
FIG. 1 is a partly-sectioned schematic side elevational view of a known ink ejection apparatus.

Before going to the detailed description of the present invention, reference is first made to FIG. 1 in which a conventional ink ejection apparatus is illustrated. More specifically, FIG. 1 is an illustration of the ink ejection apparatus disclosed in U.S. Pat. No. 4,106,032 granted to M. Miura et al and assigned to the same asignee as the present invention. The apparatus disclosed in the aforesaid United States Patent comprises an ink ejecting head A, an ink supply container 13 and a source of pressurized air 14. The ejecting head A comprises a piezoelectric transducer 1 secured to a diaphragm 2, both being mounted on the rear of the head A and connected respectively to the terminals of a signal source 11. The housing B of the ejecting head A is shaped to form an inner liquid chamber 3 and an outer liquid chamber 5 which are connected by a connecting channel 4, the outer chamber 5 being connected to the ink supply source 13 via a tube 9. The housing B further includes an air chamber 7 forwardly of the outer liquid chamber 5. The air chamber 7 is connected to the air supply source 14 through a tube 10 to provide a stream of air through a nozzle 8 which is coaxially aligned with a liquid ejection nozzle 6. The inner and outer liquid chambers are filled with ink which is ejected through nozzles 6 and 8 when the pressure in the chamber 3 is raised in response to the application of an electrical signal to the piezoelectric transducer 1. The air stream is constantly provided to assist the discharged ink droplets in forming a jet stream and in landing on a same location on a writing surface.

The axial dimension of the air chamber 7 adjacent to the nozzles 6 and 8 is 80 micronmeters or less to provide minute changes in the shades or gradation and a lowering of the minimum operating voltage of the ejecting unit.

The apparatus further includes air pressure adjusting valves 15 and 16 to prevent the ink in the outer chamber 5 from being forced forward by the action of the air stream in the absence of the drive signal.

Figure 2:
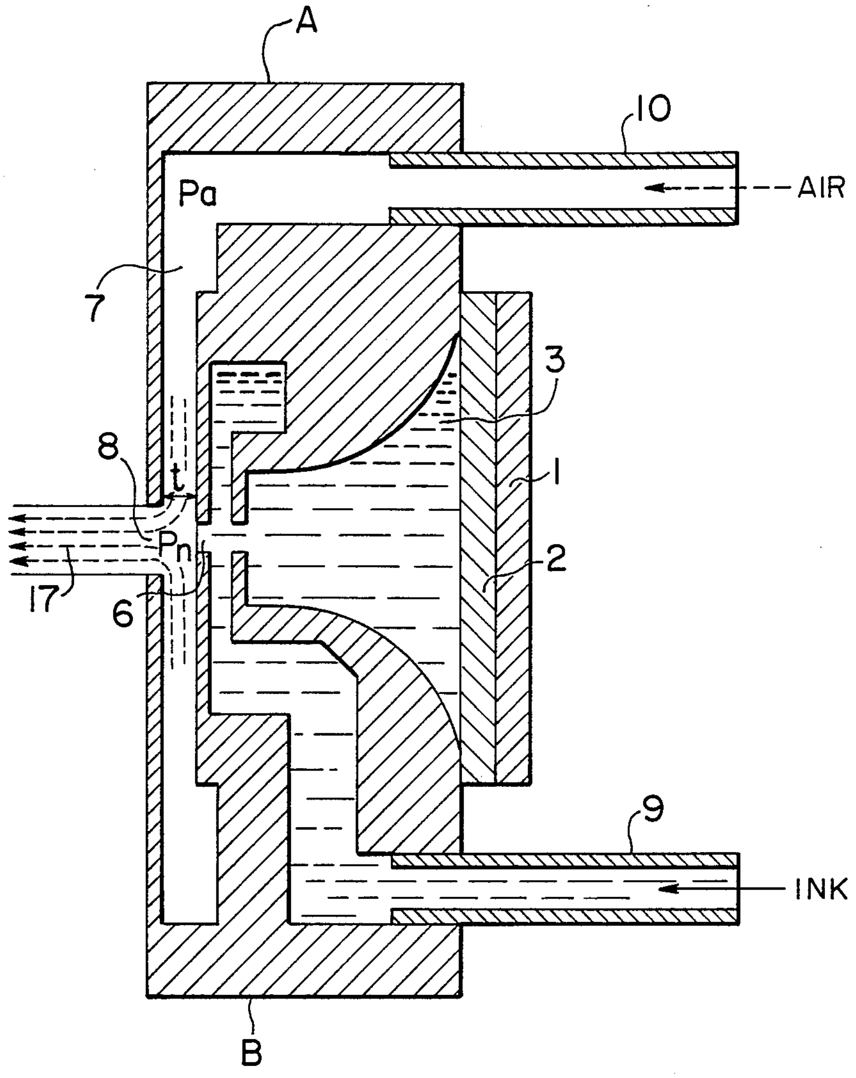
FIG. 2 is a sectional view of an ink ejection head used in the ink ejection apparatus of the present invention, illustrating the principle of operation in which a stream of air is applied to an ink droplet.

The principle of the present invention will be described hereinafter with reference to FIG. 2 which is a sectional view of an ink ejection head in which a stream of air is applied to the ink droplets. When a constant pneumatic pressure Pa is applied to the air in an air chamber 7 of the ink jet head, the air is discharged through an air nozzle 8 in the form of an air stream 17 of a high velocity, so that a reduction in the pressure occurs in an ink nozzle 6 which opposes the air nozzle 8. The pressure in the ink nozzle 6 in this state is defined as the balance pressure Pn. The balance pressure Pn is determined by dimensions of the head, particularly the diameters of the air nozzle 8, ink nozzle 6 and the thickness t of the air layer in the air chamber 7, provided that the diameter of the air nozzle 8, diameter of the ink nozzle 6 and the pneumatic pressure applied are constant. The smaller the thickness t, the lower the balance pressure Pn.

The pressure Pn is a value peculiar in the head. For instance, different ink ejection heads have different constant values peculiar thereto, e.g., 0.104 kg/cm$^2$, 0.107 kg/cm$^2$ and 0.109 kg/cm$^2$ at air pressure Pa of 0.125 kg/cm$^2$. Needless to say, the same ink ejection head exhibits different values of the balance pressure Pn in response to different pneumatic pressure Pa.

The balance pressure Pn is the ink pressure at which, when a predetermined pneumatic pressure, e.g., 0.125 kg/cm$^2$ is applied to the air in the air chamber 7, the meniscus of the ink in the ink nozzle 6 is flattened, i.e., the ink pressure at which the pressures across the ink nozzle 6 are balanced without causing the ink to be induced from the ink nozzle 6.

In the case of the ink ejecting head having the balance pressure Pn of 0.104 kg/cm$^2$, the pneumatic pressure Pa of 0.125 kg/cm$^2$ is balanced by the ink pressure and the ink meniscus in the ink nozzle 6 is flattened if the level of the ink in the ink tank is positioned 21 cm (this corresponds to 0.021 kg/cm$^2$ assuming that the density of the ink is 1) below the level of the ink nozzle 6. Similarly, the balance of pressure across the ink nozzle is obtained in the ink ejection heads having the balance pressures Pn of 0.107 kg/cm$^2$ and 0.109 kg/cm$^2$, respectively, provided that the levels of the ink to be supplied to these ink ejection heads are positioned 18 cm (corresponding to 0.018 kg/cm$^2$) and 16 cm (corresponding to 0.016 kg/cm$^2$), respectively, below the ink nozzles 6 of these ink ejection heads.

The equalization of the ink pressures in the ink nozzles 6 of the ink ejection heads having different values of the balance pressure Pn can be attained also by varying the heights or levels of the ink ejection heads, while maintaining the ink levels equal. For instance, such an equalization can be accomplished by positioning the ink ejection head having the balance pressure Pn of 0.107 kg/cm$^2$ 2 cm above the ink ejection head having the balance pressure of Pn of 0.109 kg/cm$^2$, and positioning the ink ejection head having the balance pressure Pn of 0.104 kg/cm$^2$ 5 cm above the same.

From the view point of design of the apparatus, it is quite inconvenient that large height difference more than 10 cm has to be formed between the ink ejection head and the ink tank. In order to avoid such an inconvenience, it is proposed to reduce the pressure in the ink tank by a suitable pressure adjusting means so as to enable the height differences between the ink ejection heads and the ink tank to be reduced. For instance, the aforementioned height differences between the ink nozzles and the ink levels, i.e., 21 cm, 18 cm and 16 cm, respectively, can be reduced to 6 cm, 3 cm and 1 cm, by applying a pressure of 0.110 kg/cm$^2$ to the ink tank, when the pneumatic pressure applied to the air chamber 7 is 0.125 kg/cm$^2$.

It is thus possible to obtain an ink ejection recording apparatus having a plurality of ink ejection heads arranged at different heights, with the ink pressures in the ink nozzles in these ink ejection heads being equalized, by designing such that the differences of the heights of these ink ejection heads correspond to the differences in the balance pressure.

With such an arrangement, it is possible to prepare independent ink tanks for different ink ejection heads, so that the reliability of the system is increased and the cost of the same is reduced. In addition, since the ink tank can have an increased volume as compared to the known systems, the frequency of the supply of the ink to the ink tank can be reduced advantageously.

An embodiment of the ink ejection recording apparatus of the present invention will be described hereinunder.

Figure 3:
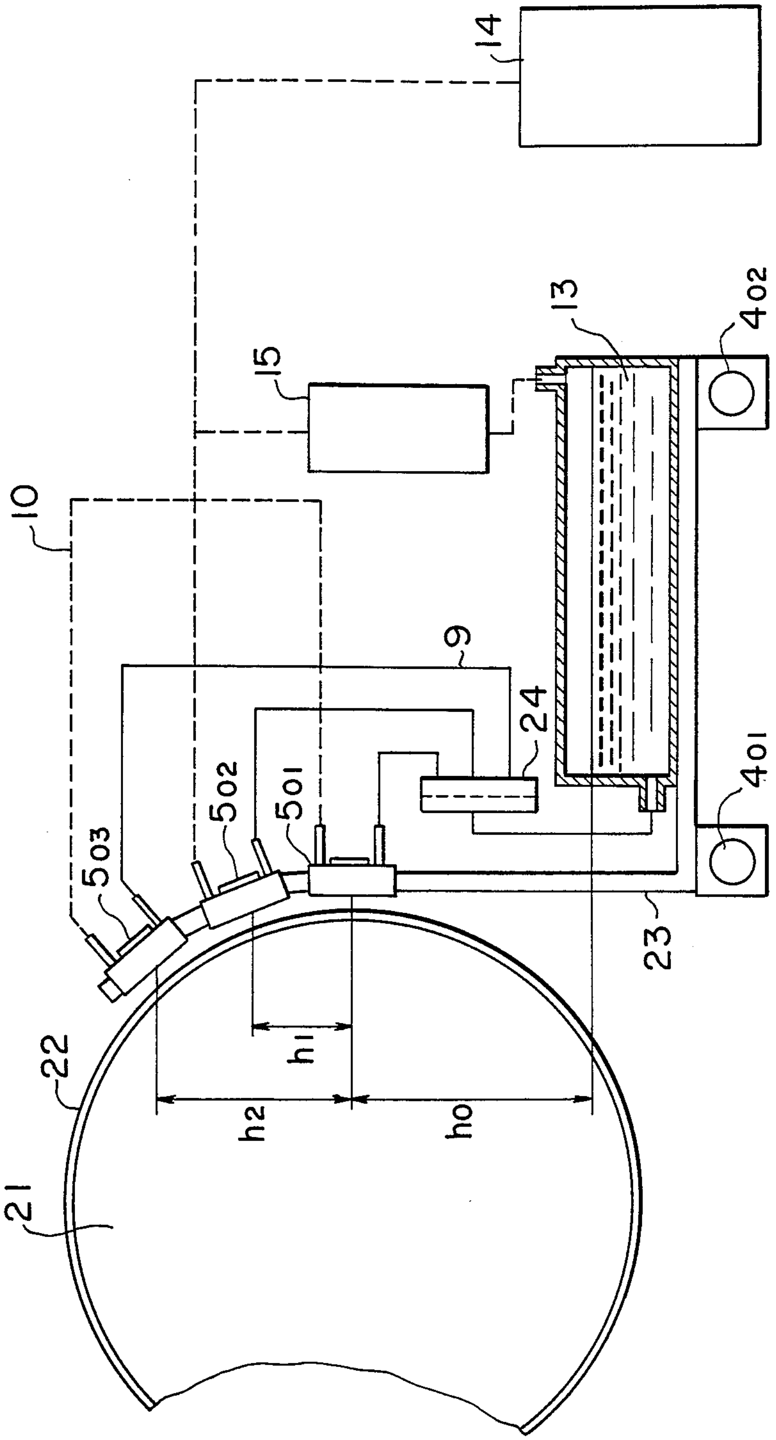
FIG. 3 is a side elevational view of an essential portion of an ink ejection recording apparatus in accordance with an embodiment of the present invention.

Referring to FIG. 3, an ink ejection recording apparatus of the present invention has a drum 21 on which a sheet of recording paper 22 is wound and a carriage 23 which is movable in the sub-scanning direction of the drum 21 along guide shafts $4_{01}$ and $4_{02}$. The carriage 23 carries ink ejection heads $5_{01}$ to $5_{03}$ which are adapted to be supplied with an ink from an ink tank 13 through an ink filter 24 and an ink tube 9. An air supply device 14 is adapted to supply air to the ink ejection heads $5_{01}$ to $5_{03}$ through an air tube 10. The pressure of the air supplied to the ink tank is regulated by a pressure adjusting device 15. In FIG. 3, a symbol $h_0$ represents the height of the lowermost ink ejection head $5_{01}$ from the level of the ink in the ink tank 13, $h_0$ represents the height of the intermediate ink ejection head $5_{02}$ from the lowermost ink ejection head $5_{01}$, and $h_2$ represents the height of the uppermost ink ejection head $5_{03}$ from the lower most ink ejection head $5_{01}$.

The ink ejection heads $5_{01}$ to $5_{03}$ are arranged such that they are fixed in the sub-scanning direction by an amount corresponding to the line pitch and equi-spaced in the direction of main scanning. As stated before, the intermediate ink ejection head $5_{02}$ and the uppermost ink ejection printer $5_{03}$ are disposed, respectively, $h_1$ cm and $h_2$ cm above the lowermost ink ejection head $5_{01}$.

It is assumed here that the balance pressure $P_n$ of the lowermost ink ejection head $5_{01}$ is $P_{n-1}$ kg/cm². In such a case, the balance pressures $P_{n-2}$ and $P_{n-3}$ of the intermediate and the uppermost ink ejection heads should be $[P_{n-1}-(h_1\times\rho/1000)]$ kg/cm² and $[P_{n-1}-(h_2\times\rho/1000)]$ kg/cm², respectively. For instance, if the heights $h_2$ and $h_3$ are 3 cm and 5 cm, respectively, and if the balance pressure $P_{n-1}$ is 0.110 kg/cm², ink ejection heads having the balance pressures $P_{n-2}$ and $P_{n-3}$ of 0.107 kg/cm² and 0.105 kg/cm², respectively, should be used as the intermediate and the uppermost ink ejection heads.

The height $h_0$ of the lowermost ink ejection head $5_{01}$, as measured from the surface of the ink in the ink tank 13, is generally 5 cm or so. Application of the air pressure to the ink ejection heads is not conducted when the printer is not operating, so that the ink meniscus in each ink ejection head receives a negative pressure of a level corresponding to the height of the ink nozzle from the ink surface in the ink tank 13.

Then, as the power supply to the printer is turned on, the air pressure supplying device 14 starts to operate so that pressurized air is supplied both to the ink jet heads $5_{01}$ to $5_{03}$ and the ink tank 13. An adjustment is made before hand such that the pneumatic pressure applied to the ink tank 13 is equal to the balance pressure $P_n$ of the lowermost ink jet head $5_{01}$. When the pneumatic pressure regulated by the pressure adjusting device 10 reaches a predetermined level, the ink pressures applied to the ink meniscuses of all the heads are equalized, so that an equal discharging condition is given to all ink ejection heads.

The ink tank 13 has a thin structure so that the maximum change in the level of the ink due to consumption is on the order of 1 to 2 cm, thus assuring high stability of the ink discharging characteristics of all the ink ejection heads.

As has been described, according to the present invention, an ink ejection recording apparatus is provided in which a plurality of ink ejection heads, which make use of air stream in jetting ink droplets, are arranged at different heights, and the ink ejection heads thus arranged have different values of balance pressure corresponding to the difference in height, so that the ink pressure acting on the ink meniscuses of all the ink ejection heads and, hence, the ink discharging characteristics of all the ink ejection heads are equalized. In the case of a color printer, only four ink tanks are needed: one for each of yellow, magenta, cyan and black, regardless of the number of the ink ejection heads arranged for each color in the main scanning direction. In consequence, the arrangement of the apparatus is remarkably simplified, thus attaining a remarkable improvement in the reliability and facilitating the maintenance, while reducing the production cost.

Figure 4:
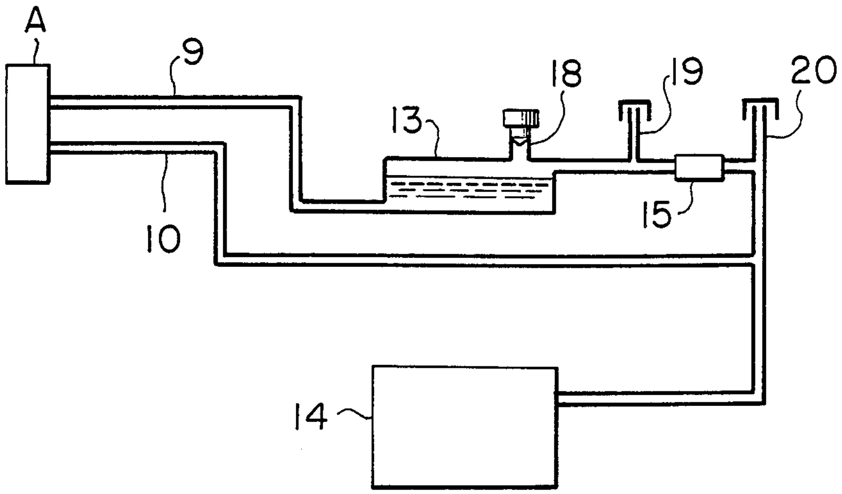
FIG. 4 is a schematic illustration of the piping arrangement in the ink ejection recording apparatus in accordance with the present invention.

FIG. 4 shows in detail the air supply system between the air supplying device 14 and the ink tank 13.

An ink supply line 9 and an air supply line 10 are connected to the ink ejection head A. The ink ejection head A is of on-demand type and is installed in such a state that the ink pressure and the pneumatic pressure are well balanced and stabilized.

Compressed air is supplied to the ink tank 13 from the air supplying device 14 via the pneumatic pressure adjusting device 15. The compressed air also is supplied from the air supplying device 14 to the ink ejection head A through the air supply line 10. The ink tank 13 has an ink filling port 18 and an ink tank pressure relief port 19 both of which are usually closed by caps so as not to allow air to escape therethrough. A head relief port 20 is provided on the air supply line 10. This relief port 20 also is closed by a cap so as not to allow the air to escape through this relief port 20.

Figure 5:
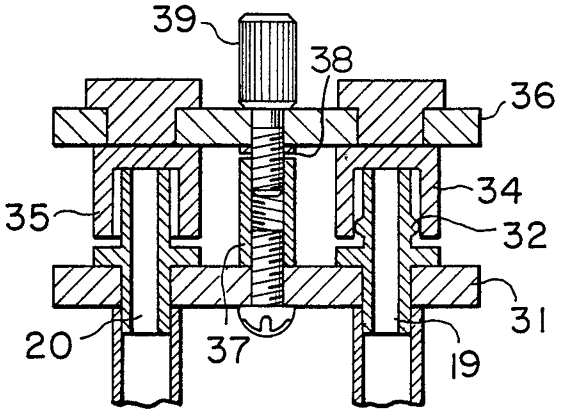
FIG. 5 is a sectional side elevational view of an essential portion of the arrangement shown in FIG. 4, particularly a portion near the air relief port in the piping arrangement.

FIG. 5 shows, in sectional side elevation, the detail of construction of the relief ports 19 and 20. Referring to this Figure, a reference numeral 31 designates a mount plate in which are fixed the ink tank relief port 19 and the head relief port 20. The ink tank relief port 19 has an outer peripheral ridge 32 which exhibits mechanical resistance. Although not shown, air supply lines lead from the ink tank relief port 19 and the head relief port 20 to the ink tank 13 and the ink ejection head A, respectively. A spacer 37 having a threaded bore for receiving a stopper screw 39 is provided on the mount plate 31. Caps 34 and 35 are integrally secured to a resilient cap plate 36 so as to oppose the ink tank relief port 19 and the head relief port 20. A stopper screw 39 is secured to the cap plate 36 by means of an E-type stopper ring 38, in order to ensure perfect closing of the relief ports and to prevent the caps from coming off.

The operation of the relief ports having the described construction is as follows. Referring to FIG. 4, as the discharge of the ink from the ink ejection head proceeds, the amount of the ink remaining in the ink tank 13 is progressively decreased. In consequence, an operation has to be conducted for supplying the ink into the ink tank. The supply of the ink into the ink tank 13 is done through the ink filling port 18. However, since compressed air stagnates in the ink tank 13 and the air supply line 10, it is necessary to relief the compressed air in advance of the supply of the ink. The relief of the compressed air is done through the relief ports 19 and 20. There is a risk in that, if the ink tank relief port 19 is opened earlier than the head relief port 20, the pressure in the ink tank 13 drops drastically to generate voids in the ink therein, the voids being then introduced into an ink chamber of the ink ejection head A. Needless to say, normal ink discharging condition cannot be obtained in this state, so that the ink ejection recording apparatus cannot operate.

It is, therefore, essential that the cap 34 of the ink tank relief port 19 comes off only after the cap 35 of the head relief port 20 has come off.

After the air supplying device 14 is stopped, the user loosenes the stopper screw 39 so that the cap 35 on the head relief port 20 is moved apart from the end of the port 20 so as to relieve the compressed air. As the stopper screw 39 is further rotated and disengaged from the threaded bore in the spacer 37, the cap plate 36 is ready to come off. It is to be understood that the cap 35 on the head relief port comes off comparatively easily, while the cap 34 on the ink tank relief port 19 do not come off easily because the outer peripheral ridge 32 formed on the tank relief port 19 produces a mechanical resistance which serves to prevent the cap 34 from coming off. The escape or relief of the air through the tank relief port 19 is prevented even after the cap plate 36 is inclined, because the outer peripheral ridge 32 makes a sealing contact with the inner peripheral surface of the cap 34.

Thus, the relief of compressed air in advance of the supply of the ink is done in such a manner, without fail, that the cap 35 associated with the head relief port 20 comes off first and then the cap 34 associated with the tank relief port 19 comes of, simply by unscrewing the stopper screw 39 and pulling the cap plate 36 upward. It is, therefore, possible to prevent undesirable introduction of voids into the ink chamber in the ink jet head A.

What is claimed is:

1. An ink ejection recording apparatus comprising an ink tank; a plurality of ink ejection heads receiving ink from said ink tank and arranged a different heights with respect to said ink tank; each of said ink ejection heads comprising an ink nozzle through which minute ink droplets are discharged in accordance with an electric signal, and an air nozzle opposing to said ink nozzle and adapted for forming an air stream which accelerates said ink droplets towards a recording medium so as to record an image on said recording medium by means of said droplets; means for applying pneumatic pressure to said ink ejection heads and said ink tank; means for establishing different levels of balance pressure for said ink ejection heads so that the levels of ink pressure acting on said ink nozzles of said ink ejection heads are equalized in the operating state of said apparatus; means for applying pneumatic pressure to each of said ink ejection heads and said ink tank, means for relieving pneumatic pressure applied to said ink ejection heads, means for relieving the pneumatic pressure applied to said ink tank, and relief controlling means for controlling pressure relief such that the relief of the pneumatic pressure from said ink ejection heads is conducted before the relief of pneumatic pressure from said ink tank.

2. An ink ejection recording apparatus as set forth in claim 1, further comprising means for adjusting the pneumatic pressure applied to said ink tank.

3. An ink ejection recording apparatus as set forth in claim 1, wherein the level of the pneumatic pressure applied to said ink tank is lower than the level of the pneumatic pressure applied to said ink ejection heads.

4. An ink ejection recording apparatus as set forth in claim 1, wherein four ink tanks are used such that each ink tank contains one of cyan, magenta, yellow and black inks, and wherein each of said tanks is connected to a plurality of said ink ejection heads.

5. An ink jet recording apparatus comprising:

at least one ink ejection head having an ink nozzle and an air nozzle which are arranged coaxially;

an ink tank for supplying said ink ejection head with an ink;

a pneumatic pressure generating device for applying pneumatic pressure to said ink tank, said pneumatic pressure generating device being adapted to apply pneumatic pressure also to said ink ejection head so as to produce an air stream through said air nozzle;

a pneumatic pressure adjusting means which creates a difference between the pneumatic pressure applied to said ink tank and the pneumatic pressure supplied to said head is produced;

a first pressure relieving port for relieving the pneumatic pressure applied by said pneumatic pressure generating means to said ink tank;

a second pressure relieving port for relieving the pneumatic pressure applied to said head; and closure means for closing said first and second pressure relieving ports and including means for imparting mechanical resistance to said second pressure relieving port so as to ensure that, when the pressures are relieved, said second pressure relieving port opens after the opening of said first pressure relieving port.

6. An ink ejection recording apparatus as set forth in claim 5, wherein said closure means includes a resilient plate having caps for closing said first and second pressure relieving ports and adapted to resiliently press said caps onto said pressure relieving ports.

7. An ink ejection recording apparatus as set forth in claim 5, wherein said means for imparting mechanical resistance includes an outer peripheral ridge provided on the outer periphery of said first pressure relieving port.

8. An ink ejection recording apparatus comprising:

a rotary drum on which a recording medium is wound;

an ink tank;

a plurality of ink ejection heads connected to said ink tank and arranged along the periphery of said rotary drum, each of said ink ejection heads having an ink nozzle for discharging ink droplets in accordance with electric signals and an air nozzle arranged coaxially with said ink nozzle for propelling said ink droplets;

said ink ejection heads being mounted at different heights relative to said ink tank and having different levels of balance pressure so that the levels of the ink pressure applied to said ink nozzles of said ink ejection heads are equal in the operating state of said apparatus;

means for supplying said ink ejection heads and said ink tank with pneumatic pressure;

means for moving said ink ejection heads in the longitudinal direction of said rotary drum;

first pressure relieving means for relieving the pneumatic pressure applied to said ink ejection heads, second pressure relieving means for relieving the pneumatic pressure applied to said ink tank, and pressure relief controlling means for controlling the relief of the pneumatic pressure such that the relief of the pneumatic pressure from said ink tank is conducted after the relief of pneumatic pressure from said ink ejection heads.

9. An ink ejection recording apparatus as set forth in claim 8, wherein said ink ejection heads are offset, in the direction of rotation of said rotary drum, by an amount equal to the pitch of the scanning line and, in the longitudinal direction of said rotary drum, at a predetermined pitch.

10. An ink ejection recording apparatus as set forth in claim 8, further comprising pressure adjusting means for adjusting the pnuematic pressure applied to said ink tank.

11. An ink ejection recording apparatus as set forth in claim 8, comprising four units each including said plurality of ink ejection heads and said ink tank to which said ink ejection heads are connected commonly, each of said ink tanks containing one of cyan, magenta, yellow and black inks.

* * * * *